(12) United States Patent
Zimmer et al.

(10) Patent No.: US 9,625,103 B2
(45) Date of Patent: Apr. 18, 2017

(54) METHOD AND APPARATUS FOR DETERMINING AND CONTROLLING A STATIC FLUID PRESSURE THROUGH A VIBRATING METER

(75) Inventors: Patrick John Zimmer, Arnolds Park, IA (US); Joel Weinstein, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 303 days.

(21) Appl. No.: 14/118,807

(22) PCT Filed: Jun. 8, 2011

(86) PCT No.: PCT/US2011/039611
§ 371 (c)(1),
(2), (4) Date: Nov. 19, 2013

(87) PCT Pub. No.: WO2012/170020
PCT Pub. Date: Dec. 13, 2012

(65) Prior Publication Data
US 2014/0076408 A1 Mar. 20, 2014

(51) Int. Cl.
*F17D 1/20* (2006.01)
*G01F 1/84* (2006.01)
(Continued)

(52) U.S. Cl.
CPC .............. *F17D 1/20* (2013.01); *F17D 1/005* (2013.01); *G01F 1/74* (2013.01); *G01F 1/84* (2013.01);
(Continued)

(58) Field of Classification Search
CPC .......... F17D 1/20; F17D 1/005; G01F 1/8436; G01F 1/74; G01F 1/84; G01F 15/024;
(Continued)

(56) References Cited

U.S. PATENT DOCUMENTS 4,911,006 A * 3/1990 Hargarten ................ B67D 7/08
702/183
5,594,180 A * 1/1997 Carpenter .................. G01F 1/74
303/15

(Continued)

FOREIGN PATENT DOCUMENTS

JP        200889373      4/2008
WO      2009102317 A1   8/2009
WO      2011080171 A2   7/2011

*Primary Examiner* — Craig Schneider
*Assistant Examiner* — Minh Le
(74) *Attorney, Agent, or Firm* — The Ollila Law Group LLC

(57) ABSTRACT

A method for operating a fluid flow system (300) is provided. The fluid flow system (300) includes a fluid flowing through a pipeline (301), a first pressure sensor (303) located within the pipeline (301), and a vibrating meter (5). The vibrating meter (5) includes a sensor assembly (10) in fluid communication with the first pressure sensor (303). The method includes steps of measuring a pressure of the fluid within the pipeline (301) using the first pressure sensor (303) and measuring one or more flow characteristics of the fluid using the vibrating meter (5). The method further includes a step of determining a static pressure of the fluid based on the pressure of the fluid within the pipeline (301) and the one or more flow characteristics. The method further includes a step of determining if the fluid contains at least some gas based on the static pressure of the fluid.

7 Claims, 7 Drawing Sheets

(51) Int. Cl.
*G01F 1/74* (2006.01)
*G01F 15/02* (2006.01)
*F17D 1/00* (2006.01)

(52) U.S. Cl.
CPC .......... *G01F 1/8436* (2013.01); *G01F 15/024* (2013.01); *Y10T 137/0379* (2015.04); *Y10T 137/776* (2015.04)

(58) Field of Classification Search
CPC .......... Y10T 137/0379; Y10T 137/776; Y10T 137/7761; Y10T 137/7758
USPC .......... 137/12, 485, 487, 487.5; 73/861.354, 73/861.355, 861.356, 1.31, 1.16
See application file for complete search history.

(56) References Cited

U.S. PATENT DOCUMENTS

| | | | | |
|---|---|---|---|---|
| 5,699,839 A * | 12/1997 | Dehne | .............. | F17C 6/00 141/18 |
| 6,327,914 B1 * | 12/2001 | Dutton | .............. | G01F 1/8413 73/32 A |
| 6,378,354 B1 * | 4/2002 | Sharp | .............. | G01F 25/0007 73/1.16 |
| 7,028,528 B2 * | 4/2006 | Antonijevic | .............. | G01F 25/003 73/1.16 |
| 7,058,549 B2 * | 6/2006 | Gysling | .............. | G01F 1/7082 702/189 |
| 7,134,320 B2 * | 11/2006 | Gysling | .............. | G01F 1/74 73/32 A |
| 7,152,460 B2 * | 12/2006 | Gysling | .............. | G01F 1/74 73/32 A |
| 7,389,687 B2 * | 6/2008 | Gysling | .............. | G01F 1/666 73/200 |
| 7,597,008 B2 * | 10/2009 | Patten | .............. | G01F 1/8436 73/32 A |
| 8,302,491 B2 * | 11/2012 | Stack | .............. | G01F 1/8477 73/861.356 |
| 8,448,491 B2 * | 5/2013 | Van Cleve | .............. | G01F 1/74 702/54 |
| 8,521,436 B2 * | 8/2013 | Agar | .............. | G01F 1/44 702/12 |
| 8,589,091 B2 * | 11/2013 | Stack | .............. | G01F 1/74 702/48 |
| 8,881,604 B2 * | 11/2014 | Zhu | .............. | G01F 1/74 73/861.354 |
| 2002/0033043 A1 | 3/2002 | Dutton et al. | | |
| 2005/0081643 A1 * | 4/2005 | Mattar | .............. | G01F 1/74 73/861.355 |
| 2005/0193832 A1 * | 9/2005 | Tombs | .............. | G01F 1/74 73/861 |
| 2005/0284237 A1 * | 12/2005 | Henry | .............. | G01F 1/74 73/861.356 |
| 2006/0133941 A1 | 6/2006 | Breithaupt | | |
| 2007/0084298 A1 | 4/2007 | Rieder | | |
| 2008/0223148 A1 * | 9/2008 | Cunningham | .............. | G01F 1/8413 73/861.356 |
| 2010/0089174 A1 * | 4/2010 | Van Cleve | .............. | G01F 1/8413 73/861.357 |
| 2010/0134304 A1 * | 6/2010 | Weinstein | .............. | G01F 1/74 340/632 |
| 2010/0299089 A1 * | 11/2010 | Stack | .............. | G01F 1/74 702/48 |
| 2012/0232811 A1 * | 9/2012 | Pankratz | .............. | G01F 1/8436 702/47 |
| 2014/0116107 A1 * | 5/2014 | Weinstein | .............. | G01F 1/002 73/1.31 |
| 2014/0190238 A1 * | 7/2014 | Mcanally | .............. | G01F 1/8431 73/30.01 |
| 2014/0208871 A1 * | 7/2014 | Hays | .............. | G01F 1/72 73/861.355 |
| 2014/0251026 A1 * | 9/2014 | Oddie | .............. | G01F 1/8468 73/861.355 |
| 2014/0366644 A1 * | 12/2014 | Henry | .............. | G01F 1/74 73/861.355 |
| 2015/0160056 A1 * | 6/2015 | Schollenberger | .............. | G01F 1/74 73/861.357 |

* cited by examiner

METHOD AND APPARATUS FOR DETERMINING AND CONTROLLING A STATIC FLUID PRESSURE THROUGH A VIBRATING METER

TECHNICAL FIELD

The embodiments described below relate to, fluid flow systems, and more particularly, to a method and system for determining and controlling a static fluid pressure through a vibrating meter of a fluid flow system.

BACKGROUND OF THE INVENTION

Vibrating meters, such as for example, vibrating densitometers and Coriolis flow meters are generally known and are used to measure mass flow and other information for materials within a conduit. The meter comprises a sensor assembly and an electronics portion. The material within the sensor assembly may be flowing or stationary. Each type of sensor may have unique characteristics, which a meter must account for in order to achieve optimum performance.

Exemplary Coriolis flow meters are disclosed in U.S. Pat. No. 4,109,524, U.S. Pat. No. 4,491,025, and Re. 31,450 all to J. E. Smith et al. These flow meters have one or more conduits of straight or curved configuration. Each conduit configuration in a Coriolis mass flow meter has a set of natural vibration modes, which may be of simple bending, torsional, or coupled type. Each conduit can be driven to oscillate at a preferred mode.

Material flows into the flow meter sensor assembly from a connected pipeline on the inlet side of the sensor, is directed through the conduit(s), and exits the sensor through the outlet side of the sensor. The natural vibration modes of the vibrating material filled system are defined in part by the combined mass of the conduits and the material flowing within the conduits.

When there is no flow through the sensor assembly, a driving force applied to the conduit(s) causes all points along the conduit(s) to oscillate with identical phase or small "zero offset," which is a time delay measured at zero flow. As material begins to flow through the sensor assembly, Coriolis forces cause each point along the conduit(s) to have a different phase. For example, the phase at the inlet end of the sensor lags the phase at the centralized driver position, while the phase at the outlet leads the phase at the centralized driver position. Pick-off sensors on the conduit(s) produce sinusoidal signals representative of the motion of the conduit(s). Signals output from the pick-off sensors are processed to determine the phase difference between the pick-off sensors. The phase difference between the two or more pick-off sensors is proportional to the mass flow rate of material flowing through the conduit(s).

The mass flow rate of the material can be determined by multiplying the phase difference by a Flow Calibration Factor (FCF). Prior to installation of the sensor assembly of the flow meter into a pipeline, the FCF is determined by a calibration process. In the calibration process, a fluid is passed through the flow tube at a known flow rate and the relationship between the phase difference and the flow rate is calculated (i.e., the FCF). The flow meter subsequently determines a flow rate by multiplying the FCF by the phase difference of the pick-off sensors. In addition, other calibration factors can be taken into account in determining the flow rate.

Due, in part, to the high accuracy of vibrating meters, and Coriolis flow meters in particular, vibrating meters have seen success in a wide variety of industries. One industry that has faced increased demands for accuracy and repeatability in measurements is the oil and gas industry. With the increasing costs associated with oil and gas, custody transfer situations have demanded improvements in measuring the quantity of oil that is actually transferred. An example of a custody transfer situation is pipeline transfer of crude oil, or even lighter hydrocarbon fluids such as propane.

One problem faced during measurement in custody transfer situations, and measurement of light hydrocarbons in particular, is outgassing or flashing of the liquid. In outgassing, the gas is released from the liquid when the fluid pressure within the pipeline, or the vibrating meter, is less than the fluid's saturation pressure. The saturation pressure is typically defined as the pressure at which a substance changes phases from a liquid or solid to a gas at a given temperature, i.e., the vapor is in thermodynamic equilibrium with its condensed phase. Therefore, the saturation pressure may change depending on whether the fluid is a pure substance or a mixture of two or more substances based on the mole fraction weighted sum of the components' saturation pressures according to Raoult's Law. The saturation pressure is sometimes referred to as the vapor pressure or the bubble point. In the present description, the pressure at which a substance changes phases from a condensed form (liquid or solid) to a gas for a pure substance or a mixture at a given temperature is referred to as the saturation pressure. While maintaining a fluid above the saturation pressure may not be problematic in some pipeline systems, it is particularly problematic as the fluid flows through any type of sensor or meter that has a reduced cross-sectional area. Measurements of various flow characteristics become increasingly difficult with fluids at pressures below their saturation pressure. Furthermore, in some circumstances, the fluid may oscillate around the saturation pressure. For example, the fluid may be above the saturation pressure during one point of the day, i.e., when it is cool in the morning; however, during the afternoon as the temperature increases, the saturation pressure may be lower and consequently, the fluid may be flowing through the system at a pressure below the saturation pressure.

Consequently, there is a need in the art for a system that can adequately maintain a fluid flowing through a fluid flow system above the fluid's saturation pressure. The embodiments described below overcome this and other problems and an advance in the art is achieved. The embodiments disclosed in the description that follows utilize flow characteristics obtained from the vibrating meter in order to adequately adjust the flow so the fluid is maintained above the fluid's saturation pressure while flowing through the vibrating meter.

SUMMARY OF THE INVENTION

A fluid flow system is provided according to an embodiment. The fluid flow system comprises a pipeline with a flowing fluid and a first pressure sensor located within the pipeline and determining a first pressure within the pipeline. According to an embodiment, the fluid flow system further comprises a vibrating meter including a sensor assembly located within the pipeline proximate to and in fluid communication with the first pressure sensor; and a meter electronics in electrical communication with the sensor assembly to receive one or more sensor signals and measure one or more flow characteristics. The fluid flow system further includes a system controller in electrical communication with the first pressure sensor and in electrical communication with the meter electronics. According to an embodiment, the system controller is configured to receive a first pressure measurement from the first pressure sensor and receive the one or more flow characteristics from the meter electronics. The system controller is further configured to determine a static pressure of the fluid based on the pressure of the fluid within the pipeline and the one or more flow characteristics. According to an embodiment, the system controller is further configured to determine if the fluid contains at least some gas based on the static pressure of the fluid.

A meter electronics for a vibrating sensor located within a pipeline with a flowing fluid and in fluid communication with one or more pressure sensors is provided according to an embodiment. The meter electronics is configured to measure one or more flow characteristics of the fluid flowing through the sensor assembly and receive a first pressure signal indicating a static pressure of the fluid in the pipeline. According to an embodiment, the meter electronics is further configured to determine a static pressure of the fluid based on the first pressure signal and the one or more measured flow characteristics and determine if the fluid contains at least some gas based on the static pressure of the fluid.

A method for operating a fluid flow system including a fluid flowing through a pipeline, a first pressure sensor located within the pipeline, and a vibrating meter including a sensor assembly in fluid communication with the first pressure sensor is provided according to an embodiment. The method comprises steps of measuring a pressure of the fluid within the pipeline using the first pressure sensor and measuring one or more flow characteristics of the fluid using the vibrating meter. According to an embodiment, the method further comprises a step of determining a static pressure of the fluid based on the pressure of the fluid within the pipeline and the one or more flow characteristics. According to an embodiment, the method further comprises a step of determining if the fluid contains at least some gas based on the static pressure of the fluid.

ASPECTS

According to an aspect, a fluid flow system comprises:
a pipeline with a flowing fluid;
a first pressure sensor located within the pipeline and determining a first pressure within the pipeline;
a vibrating meter including:
  a sensor assembly located within the pipeline proximate to and in fluid communication with the first pressure sensor; and
  a meter electronics in electrical communication with the sensor assembly and configured to receive one or more sensor signals and measure one or more flow characteristics;
a system controller in electrical communication with the first pressure sensor and in electrical communication with the meter electronics and configured to:
  receive the first pressure measurement from the first pressure sensor;
  receive the one or more flow characteristics from the meter electronics;
  determine a static pressure of the fluid based on the pressure of the fluid within the pipeline and the one or more flow characteristics; and
  determine if the fluid contains at least some gas based on the static pressure of the fluid.

Preferably, the system controller is further configured to determine the fluid contains at least some gas if the static pressure of the fluid is outside a threshold value or band.

Preferably, the system controller is further configured to adjust the fluid flow if the static pressure of the fluid is outside the threshold value or band.

Preferably, the adjustment can comprise increasing a pipeline line pressure.

Preferably, the adjustment can comprise decreasing a fluid flow rate.

Preferably, the threshold value or band is based upon a saturation pressure of the fluid.

Preferably, the system controller is further configured to determine the saturation pressure based on a measured temperature and density of the fluid.

Preferably, the system controller is further configured to determine a drive gain, compare the drive gain to a threshold value, and determine the static pressure is outside a threshold value or band if the drive gain exceeds the threshold value.

Preferably, the determined static pressure comprises the static pressure of the fluid within the sensor assembly.

According to another aspect, a meter electronics for a vibrating sensor located within a pipeline with a flowing fluid and in fluid communication with one or more pressure sensors is configured to:
  measure one or more flow characteristics of the fluid flowing through the sensor assembly;
  receive a first pressure signal indicating a static pressure of the fluid in the pipeline;
  determine a static pressure of the fluid based on the first pressure signal and the one or more measured flow characteristics; and
  determine if the fluid contains at least some gas based on the static pressure of the fluid.

Preferably, the meter electronics is further configured to determine the fluid contains at least some gas if the static pressure of the fluid is outside a threshold value or range.

Preferably, the meter electronics is further configured to adjust the fluid flow if the static pressure of the fluid is outside the threshold value or band.

Preferably, the adjustment comprises increasing the pipeline line pressure.

Preferably, the adjustment comprises decreasing a fluid flow rate.

Preferably, the threshold value or band is based upon a saturation pressure of the fluid.

Preferably, the meter electronics is further configured to determine the saturation pressure based on a measured temperature and density of the fluid.

Preferably, the meter electronics is further configured to determine a drive gain, compare the drive gain to a threshold value, and determine the static pressure is outside a threshold value or band if the drive gain exceeds a threshold value.

Preferably, the determined static pressure comprises the static pressure of the fluid within the sensor assembly.

According to another aspect, a method for operating a fluid flow system including a fluid flowing through a pipeline, a first pressure sensor located within the pipeline, and a vibrating meter including a sensor assembly in fluid communication with the first pressure sensor comprises steps of:
  measuring a pressure of the fluid within the pipeline using the first pressure sensor;
  measuring one or more flow characteristics of the fluid using the vibrating meter;

determining a static pressure of the fluid based on the pressure of the fluid within the pipeline and the one or more flow characteristics; and determining if the fluid contains at least some gas based on the static pressure of the fluid.

Preferably, the method further comprises a step of determining the fluid contains at least some gas if the static pressure of the fluid is outside a threshold value or band.

Preferably, the method further comprises a step of adjusting the fluid flow if the static pressure of the fluid is outside the threshold value or band.

Preferably, the adjusting comprises increasing a pipeline line pressure.

Preferably, the adjusting comprises decreasing a fluid flow rate.

Preferably, the threshold value or band is based upon a saturation pressure of the fluid.

Preferably, the method further comprises a step of determining the saturation pressure based on a measured temperature and density of the fluid.

Preferably, the method further comprises steps of:
determining a drive gain;
comparing the drive gain to a threshold value; and
determining the static pressure is outside a threshold value or band if the drive gain exceeds the threshold value.

Preferably, the step of determining the static pressure comprises determining the static pressure of the fluid within the sensor assembly.

DETAILED DESCRIPTION OF THE INVENTION

FIGS. 1-7 and the following description depict specific examples to teach those skilled in the art how to make and use the best mode of embodiments of a flow control system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the flow control system. As a result, the embodiments described below are not limited to the specific examples described below, but only by the claims and their equivalents.

Figure 1:
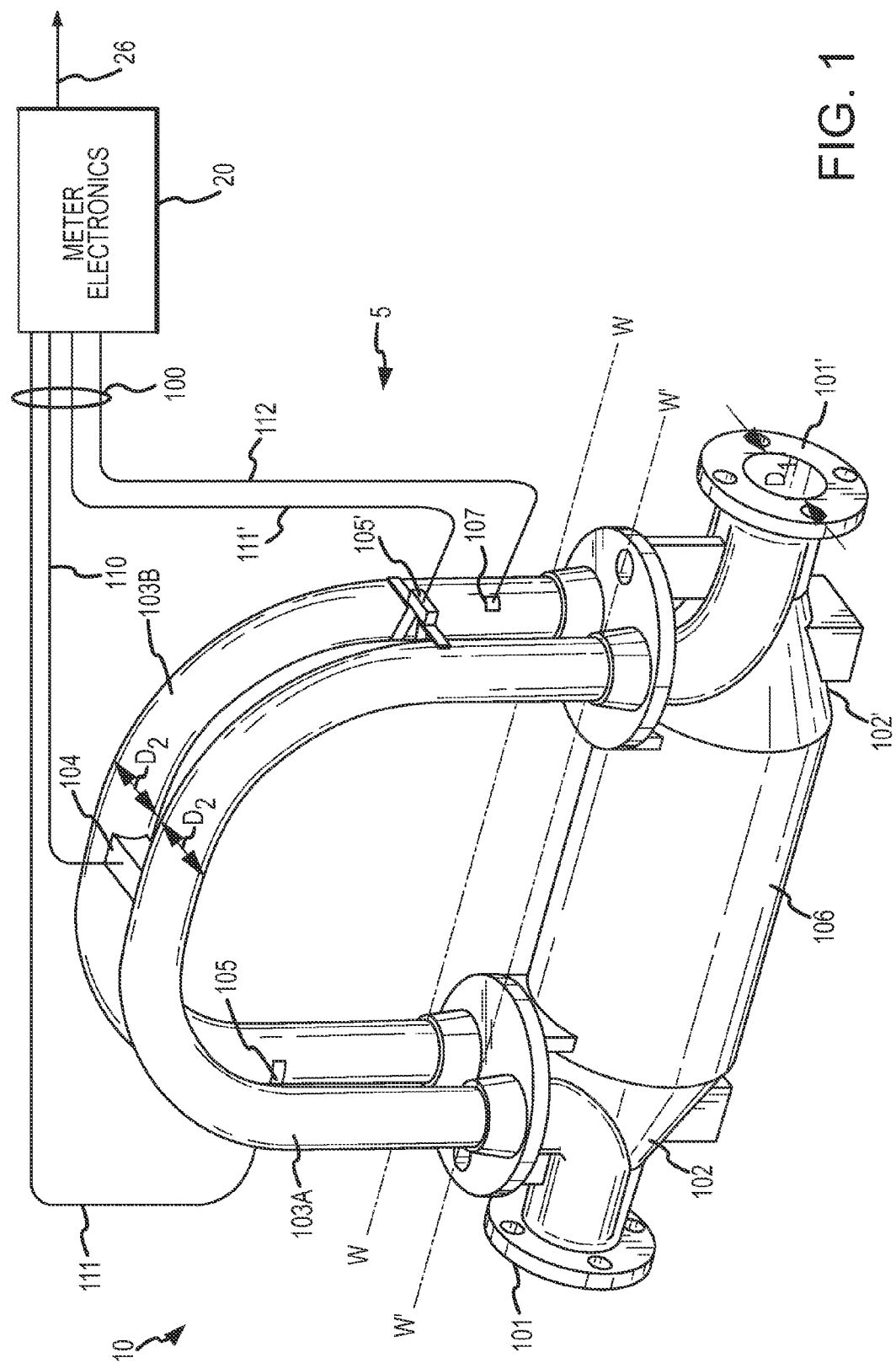
FIG. 1 shows a vibrating meter according to an embodiment.

FIG. 1 shows a vibrating meter 5 in the form of a Coriolis flow meter comprising a sensor assembly 10 and a meter electronics 20 according to an embodiment. The sensor assembly 10 and the meter electronics 20 can be in electrical communication via leads 100. The sensor assembly 10 receives a flowing fluid in the embodiment shown.

In the embodiment shown, the meter electronics 20 is connected to the sensor assembly 10 to measure one or more characteristics of a flowing material, such as, for example, a density, a mass flow rate, a volume flow rate, a totalized mass flow, a temperature, and other information. While the meter electronics 20 is shown in communication with a single sensor assembly 10, it should be appreciated that the meter electronics 20 may communicate with multiple sensor assemblies, as well as multiple additional meter electronics 20. Further, it should be appreciated that while the vibrating meter 5 is described as comprising a Coriolis flow meter, the vibrating meter 5 could just as easily comprise another type of vibrating meter, such as a vibrating densitometer, a vibrating volumetric flow meter, or some other vibrating meter that lacks all of the measurement capabilities of Coriolis flow meters. Therefore, the present embodiment should not be limited to Coriolis flow meters. Rather, the meter electronics 20 may be in communication with other types of sensor assemblies, with a flowing fluid or a stationary fluid.

The sensor assembly 10 includes a pair of flanges 101 and 101', manifolds 102 and 102', and conduits 103A and 103B. Manifolds 102, 102' are affixed to opposing ends of the conduits 103A and 103B. Flanges 101 and 101' of the Coriolis flow meter are affixed to opposite ends of the spacer 106. The spacer 106 maintains the spacing between manifolds 102, 102' to prevent undesired vibrations in the conduits 103A and 103B. The conduits 103A and 103B extend outwardly from the manifolds in an essentially parallel fashion. When the sensor 10 is inserted into a pipeline system (not shown) which carries the flowing material, the material enters sensor assembly 10 through the flange 101, passes through the inlet manifold 102 where the total amount of material is directed to enter conduits 103A, 103B, flows through the conduits 103A, 103B, and back into the outlet manifold 102' where it exits the sensor assembly 10 through the flange 101'. As shown, the flanges 101 and 101', and thus, the pipeline coupled to the flanges 101, 101' (See FIG. 3), comprises a diameter of $D_1$ while each of the flow conduits 103A and 103B comprises a reduced diameter of $D_2$. The potential reduction in the cross-sectional flow area is discussed in greater detail below.

The sensor assembly 10 can include a driver 104. The driver 104 is shown affixed to conduits 103A, 103B in a position where the driver 104 can vibrate the conduits 103A, 103B in the drive mode, for example. The driver 104 may comprise one of many well-known arrangements such as a coil mounted to the conduit 103A and an opposing magnet mounted to the conduit 103B. A drive signal in the form of an alternating current can be provided by the meter electronics 20, such as for example via pathway 110, and passed through the coil to cause both conduits 103A, 103B to oscillate about bending axes W-W and W'-W'.

The sensor assembly 10 also includes a pair of pick-off sensors 105, 105' that are affixed to the conduits 103A, 103B. According to an embodiment, the pick-off sensors 105, 105' may be electromagnetic detectors, for example, pick-off magnets and pick-off coils that produce pick-off signals that represent the velocity and position of the conduits 103A, 103B. For example, the pick-offs 105, 105' may supply pick-off signals to meter electronics 20 via pathways 111, 111'. Those of ordinary skill in the art will appreciate that the motion of the conduits 103A, 103B is proportional to certain characteristics of the flowing material, for example, the mass flow rate and the density of the material flowing through the conduits 103A, 103B.

The sensor assembly 10 can additionally include a temperature sensor 107, such as a resistance temperature device (RTD), in order to measure a temperature of the fluid within the conduits 103A, 103B. The RTD can be in electrical communication with the meter electronics 20 via lead 112.

According to an embodiment, the meter electronics 20 receives the pick-off signals from the pick-offs 105, 105'. A path 26 can provide an input and an output means that allows one or more meter electronics 20 to interface with an operator. The meter electronics 20 can measure one or more characteristics of the fluid under test such as, for example, a phase difference, a frequency, a time delay (phase difference divided by frequency), a density, a mass flow rate, a volume flow rate, a totalized mass flow, a temperature, and other information.

Figure 2:
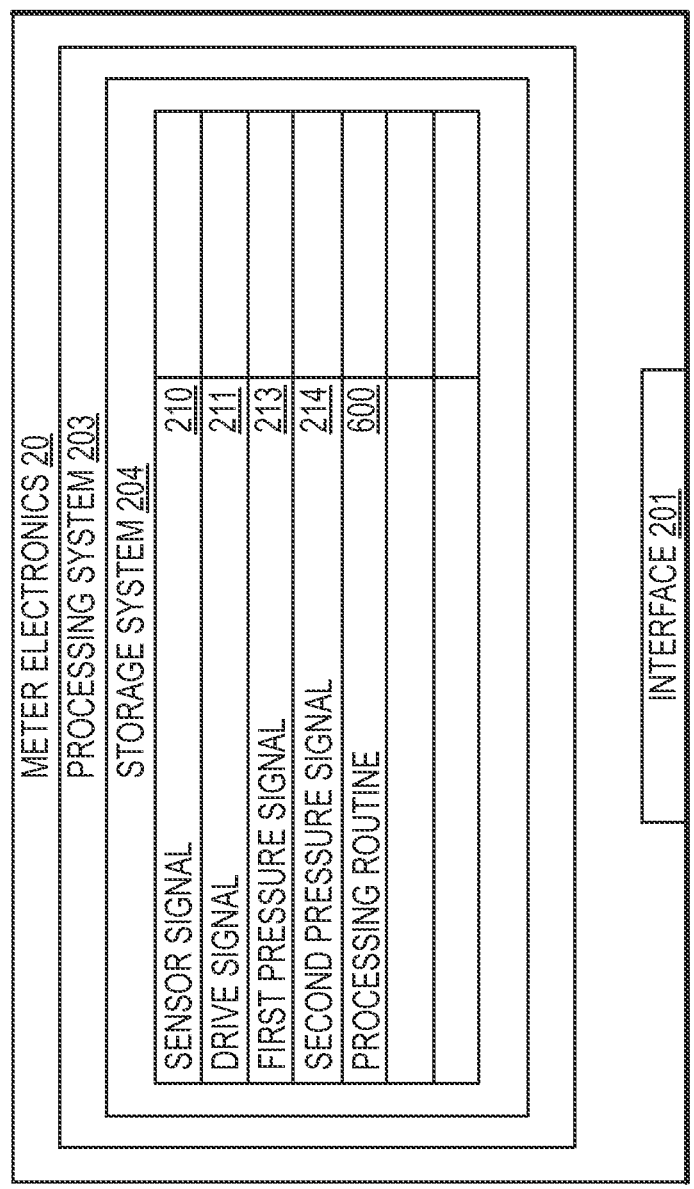
FIG. 2 shows a meter electronics for a vibrating meter according to an embodiment.

FIG. 2 shows the meter electronics 20 outlined in FIG. 1 according to an embodiment. The meter electronics 20 can include an interface 201 and a processing system 203. The processing system 203 may include a storage system 204. The storage system 204 may comprise an internal memory as shown, or alternatively, may comprise an external memory. The meter electronics 20 can generate a drive signal 211 and supply the drive signal 211 to the driver 104 shown in FIG. 1. The meter electronics 20 can also receive sensor signals 210 from the sensor assembly 10, such as from pick-off sensors 105, 105' via leads 111 and 111' shown in FIG. 1. In some embodiments, the sensor signals 210 may be received from the driver 104. The meter electronics 20 can operate as a densitometer or can operate as a flow meter, including operating as a Coriolis flow meter. It should be appreciated that the meter electronics 20 may also operate as some other type of vibrating meter assembly and the particular examples provided should not limit the scope of the present embodiment. The meter electronics 20 can process the sensor signals 210 in order to obtain one or more flow characteristics of the material flowing through the conduits 103A, 103B.

The interface 201 can receive the sensor signals 210 from the driver 104 or from the pick-off sensors 105, 105', via leads 110, 111, 111'. The interface 201 may perform any necessary or desired signal conditioning, such as any manner of formatting, amplification, buffering, etc. Alternatively, some or all of the signal conditioning can be performed in the processing system 203. In addition, the interface 201 can enable communications between the meter electronics 20 and external devices. The interface 201 can be capable of any manner of electronic, optical, or wireless communication.

The interface 201 in one embodiment, can include a digitizer (not shown), wherein the sensor signals 210 comprise analog sensor signals. The digitizer can sample and digitize the analog sensor signals and produce digital sensor signals. The digitizer can also perform any needed decimation, wherein the digital sensor signal is decimated in order to reduce the amount of signal processing needed and to reduce the processing time.

The processing system 203 can conduct operations of the meter electronics 20 and process flow measurements from the sensor assembly 10. The processing system 203 can execute the data processing required to implement one or more processing routines, as well as process the flow measurements in order to produce one or more flow characteristics.

The processing system 203 can comprise a general-purpose computer, a micro-processing system, a logic circuit, or some other general purpose or customized processing device. The processing system 203 can be distributed among multiple processing devices. The processing system 203 can include any manner of integral or independent electronic storage medium, such as the storage system 204.

It should be understood that the meter electronics 20 may include various other components and functions that are generally known in the art. These additional features are omitted from the description and figures for the purpose of brevity. Therefore, the present embodiment should not be limited to the specific embodiments shown and discussed.

Figure 3:
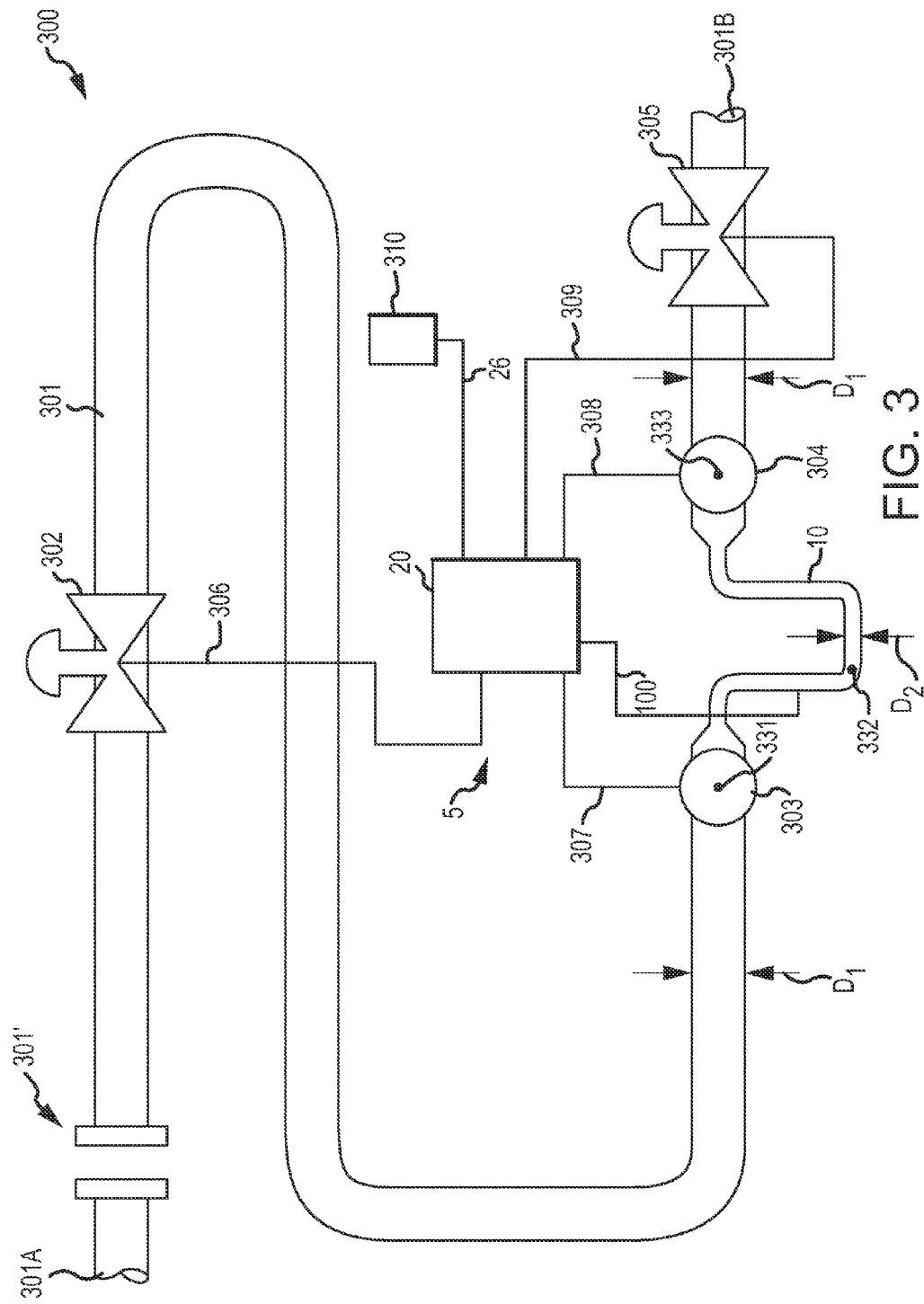
FIG. 3 shows a fluid flow system according to an embodiment.

FIG. 3 shows a fluid flow system 300 according to an embodiment. The fluid flow system 300 comprises a pipeline 301 including a fluid inlet 301A and a fluid outlet 301B. The pipeline includes a flange joint 301' where the fluid inlet 301A can be coupled to the rest of the pipeline 301. For example, in a custody transfer application, the fluid inlet 301A may be part of the seller's system while the remaining components downstream from the flange joint 301' comprise a portion of the buyer's system.

As shown, the vibrating meter 5 can be located within the pipeline 301 and comprise a portion of the fluid flow system 300. According to an embodiment, the pipeline 301 further includes a first fluid control valve 302, a first pressure sensor 303, a second pressure sensor 304, and a second fluid control valve 305, which are all in electrical communication with the meter electronics 20 via leads 306, 307, 308, and 309. Additionally shown in FIG. 3 is a system controller 310, which is in electrical communication with the meter electronics 20 via lead 311. Further, as shown, the pipeline 301 brings the above-mentioned components in fluid communication with one another.

It should be appreciated that while the first and second valves 302, 305 and the first and second pressure sensors 303, 304 are shown in direct electrical communication with the meter electronics 20, in other embodiments, these components may be in direct electrical communication with the system controller 310. Therefore, the present embodiment should not be limited to the precise configuration shown in the figures. The system controller 310 therefore, may comprise a centralized processing system, a general-purpose computer, or some other type of general or customized processing device that can process signals received from both the pressure sensors 303, 304 as well as signals from a meter electronics 20 of the vibrating meter 5. Therefore, the system controller 310 may not comprise a portion of the vibrating meter 5, but rather, be configured to process signals from the vibrating meter 5. The system controller 310 can also be in electrical communication with a user interface (not shown). This may allow a user to configure the system controller 310 according to the user's preference or requirements.

According to an embodiment, the fluid flow system 300 can be controlled such that the fluid flowing through the fluid flow system 300 remains at a pressure above the fluid's saturation pressure. As can be appreciated, the fluid within the fluid flow system 300 may comprise a pure substance or a mixture of two or more substances. Therefore, the saturation pressure of the fluid may vary based on the particular substance(s) flowing through the system 300. As can be appreciated, gas escaping from the liquid may not create problems within the pipeline 301; however, gas can create measurement problems when in the sensor assembly 10 of the vibrating meter 5 as well as other components of the fluid flow system 300. Furthermore, the fluid is most likely to fall below the saturation pressure while within the sensor assembly 10 than in other parts of the pipeline 301. One reason for this is because the total cross-sectional area of the flow conduits 103A and 103B of the sensor assembly 10 are typically smaller than the pipeline cross-sectional area as mentioned above with a pipeline diameter of $D_1$ and a flow conduit diameter of $D_2$, which is less than $D_1$. The difference in cross-sectional area is typically even greater in single flow conduit sensor assemblies compared to dual flow conduit sensor assemblies as shown in FIG. 1 where the flow rate is split between two conduits 103A, 103B. The reason for this is that single flow conduit sensors typically require a greater Coriolis force to generate a measurable time delay between pickoffs. The Coriolis force produced by a mass moving through a rotational reference frame is proportional to its velocity. A common method for increasing the Coriolis force is to increase the flow velocity of the fluid by reducing cross-sectional area.

In order to understand how to maintain the pressure of the fluid above the saturation pressure, it is important to understand what factors can affect the pressure of the fluid as it flows through the system 300. As is generally known, within a given control volume, mass is conserved. Assuming an incompressible liquid, the rate at which mass enters a control volume equals the rate at which it leaves. This principle can be illustrated using equation (1) and FIG. 3. Moving from point 331 to point 333 within the fluid flow system 300, the mass is conserved at each point. However, there is a reduction in the cross-sectional flow area as the fluid moves from point 331 to point 332 as the diameter of the flow area reduces from a total flow area defined by diameter $D_1$ of the pipeline 301 to a total flow area defined by the flow conduits 103A and 103B of the sensor assembly 10 each having a diameter $D_2$ or a flow conduit of a single flow conduit sensor assembly having a diameter $D_2$. The reduction in the cross-sectional flow area requires the velocity of the fluid to increase in order to maintain the same mass flow rate as illustrated by equation (1).

$$\dot{m}_{331} = \rho_{331} v_{331} A_{331} = \rho_{332} v_{332} A_{332} = \dot{m}_{332} \tag{1}$$

Where:
$\dot{m}$ is the mass flow rate;
$\rho$ is the fluid density;
$v$ is the average fluid velocity; and
A is the total cross-sectional area.

As can be seen, assuming the fluid density stays constant, which is a valid assumption for many fluids, the fluid velocity increases within the sensor assembly 10 to maintain the same mass flow rate as the cross-sectional area is reduced from point 331 to point 332.

Additionally known from Bernoulli's equation is that the total pressure within a system is equal to the sum of the dynamic pressure, the hydrostatic pressure, and the static pressure. The static pressure is the thermodynamic pressure at a point within a fluid and the dynamic pressure is the additional pressure due to flow velocity. The hydrostatic pressure is additional pressure due to a change in elevation above a reference plane.

$$P_{total} = P_{static} + P_{dynamic} + P_{hydrostatic} \tag{2}$$

Where:

$$P_{dynamic} = \frac{\rho v^2}{2} \tag{3}$$

$$P_{hydrostatic} = \rho g z \tag{4}$$

Where:
g is the acceleration due to gravity; and
z is elevation of a point above a reference plane.

Therefore, if the fluid within a system is assumed to comprise incompressible, inviscid, irrotational flow, the Bernoulli equation gives equation (5).

$$\text{Constant} = \frac{\rho v^2}{2} + \rho g z + P_{static} \tag{5}$$

If the pressure change caused by height (hydrostatic pressure) is neglected for the fluid flow system 300, which is a reasonable assumption for most systems, then equation (5) can be rewritten in terms of the points 331 and 332 as follows:

$$\left(\frac{\rho v^2}{2} + P_{static}\right)_{331} = \left(\frac{\rho v^2}{2} + P_{static}\right)_{332} \tag{6}$$

Referring to the fluid flow system 300, as the fluid moves from point 331 outside of the sensor assembly 10 to point 332 within the sensor assembly 10, there is a change in velocity to conserve the mass flow rate. Therefore, maintaining the relationship shown in equation (6), the dynamic pressure $$\frac{\rho v^2}{2}$$

increases dramatically, at a rate of the velocity squared, causing the static pressure to decrease. As the fluid flows out of the sensor assembly 10 and back into the pipeline 301 to point 333 where the cross-sectional area increases due to the diameter of $D_1$ increasing, the static pressure is recovered as the fluid velocity decreases to maintain the mass flow rate.

With the mass flow rate and density being easily determined by the vibrating meter 5 and the pressure sensor 303 determining the static pressure at point 331, the static pressure at point 332 within the sensor assembly 10 can easily be calculated because the cross-sectional areas of the pipeline 301 as well as the flow conduits 103A, 103B are either known or can be measured. Therefore, using Bernoulli's equation, the static pressure within the sensor assembly 10 can be determined without requiring a pressure sensor within the flow conduits 103A, 103B by rearranging equation (6). In the presently described embodiment, the cross-sectional flow area is defined by both flow conduits 103A, 103B each having a diameter $D_2$; however, in a single flow conduit sensor assembly, the cross-sectional flow area would be defined by a single flow conduit having a diameter $D_2$. For a dual flow conduit sensor assembly, it is the combined cross-sectional area of both flow conduits that is of interest for determining the velocity, as the velocity through each flow conduit should be approximately equal. Therefore, the pressure within each flow conduit 103A, 103B should be approximately equal. However, when determining the mass flow rate through the system, the meter electronics 20 will combine the mass flow through both conduits of a dual flow conduit sensor assembly as is generally known in the art.

The above discussion refers to an ideal situation where there is no unrecoverable pressure loss due to fluid viscosity, i.e., frictional losses. As is generally known, this is an unrealistic and inadequate characterization in some situations. Rather, as fluid flows through the fluid flow system 300, the fluid dissipates energy and the pressure drops across a given length of pipe. This loss in pressure is considered unrecoverable because it is consumed through frictional losses. The pressure drop due to viscous losses through a pipe can be characterized by the Darcy-Weisbach as:

$$\Delta P_{viscous} = \frac{\rho v^2}{2} \frac{fl}{D} \qquad (7)$$

Where:
$\Delta P_{viscous}$ is the viscous pressure loss;
f is the friction factor (sometimes referred to as the Darcy friction factor);
L is the length between the measurements; and
D is the pipe diameter.

The friction factor can be determined experimentally or obtained from a lookup table, chart, etc. For example, many sensor assemblies are provided with a friction factor from the manufacturer so that users can determine the unrecoverable energy loss of the fluid through the sensor assembly.

Adding equation (7) into equation (6) to account for viscous pressure losses gives equation (8).

$$\left(\frac{\rho v^2}{2} + P_{static}\right)_{331} = \left(\frac{\rho v^2}{2} + P_{static} + \Delta P_{viscous}\right)_{332} \qquad (8)$$

With viscous losses accounted for, the static pressure drops even more as the cross-sectional area of the pipe decreases in order to conserve mass flow. If the viscous pressure loss is accounted for and the pressure is measured at points 331 and 333, for example where the cross-sectional areas are substantially the same, the measured pressure loss due to viscous effects is assumed to be linear through the sensor assembly 10. This is illustrated in FIG. 4 by line 401.

Figure 4:
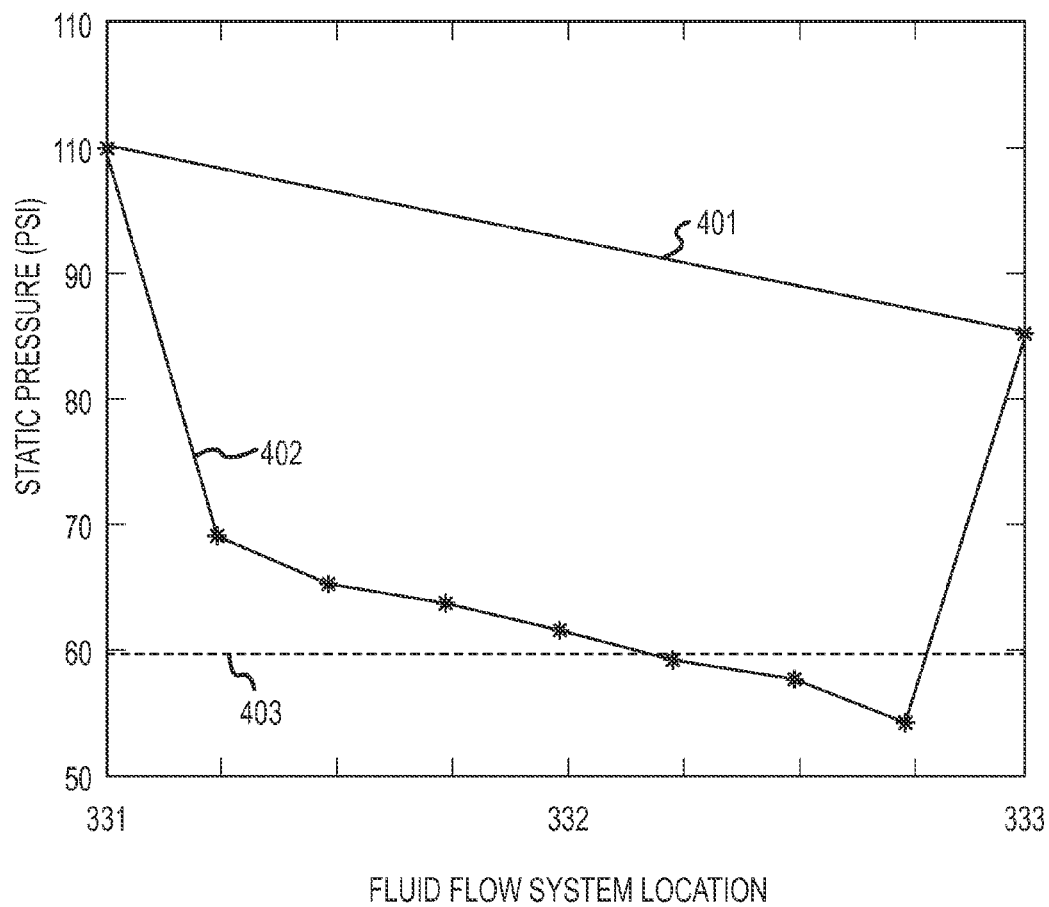
FIG. 4 shows a graph of static pressure versus fluid flow system location according to an embodiment.

FIG. 4 shows a chart of static pressure versus fluid flow system location. As can be seen, the pressure at point 331 can be measured by the first pressure sensor 303 and sent to the meter electronics 20 as a first pressure signal 213. In the embodiment shown, the first pressure is approximately 100 psi (6.9 bar). The pressure at point 333 can be measured by the second pressure sensor 304 and sent to the meter electronics 20 as a second pressure signal 214. In the embodiment shown, the second pressure is approximately 85 psi (5.9 bar). Therefore, according to the two pressure measurements typically taken in prior art systems, the user or operator would assume that the pressure has only dropped approximately 15 psi (1 bar) and thus, remained well above the saturation pressure, which is around 60 psi (4 bar) in the present example. However, measuring the pressure before and after the sensor assembly 10 without taking into account the static pressure drop occurring within the sensor assembly 10 provides an inadequate characterization of the system 300 as a whole.

As explained above, in many situations, the cross-sectional area of the flow conduits 103A, 103B are smaller than the cross-sectional area of the pipeline 301. Consequently, the lowest static pressure within the fluid flow system 300 is typically experienced within the sensor assembly 10. Line 402 in FIG. 4 represents an exemplary pressure profile of the static fluid pressure as it flows between points 331 and 332, i.e., as the fluid flows through the sensor assembly 10. As can be expected, there is a general downward trend in the static pressure due to the viscous losses. However, because the velocity increases dramatically as the fluid flows through the sensor assembly 10, the static pressure drops rapidly as the fluid velocity, and thus dynamic pressure, within the conduits 103A, 103B increases. As can be appreciated, the lowest static pressure is seen at the end of the sensor assembly 10 immediately prior to exiting the sensor assembly 10. Prior to exiting the sensor assembly 10, the static fluid pressure has fallen below the saturation pressure of the fluid. Consequently, the fluid may begin to change phases as gas escapes from the liquid.

According to an embodiment, the fluid flow through the fluid flow system 300 can be adjusted in order to ensure that the fluid remains above the fluid's saturation pressure. This control can be accomplished in at least two ways. The first way is to decrease the fluid velocity in order to decrease the dynamic pressure at location 332, which would in effect, increase the static pressure at location 332. Another way is to increase the pipeline pressure. This effectively raises both line 401 and line 402 in FIG. 4 so that no portion of line 402 falls below the saturation pressure indicated by line 403. The fluid velocity and fluid pressure within the pipeline can be controlled by adjusting a pump (not shown) or by adjusting the first and second fluid control valves 302, 305 located upstream and downstream, respectively of the sensor assembly 10. For example, if the first fluid control valve 302 located upstream of the sensor assembly 10 is partially closed (flow restricted), the flow velocity will decrease. If instead, the first fluid control valve 302 is opened further and/or the second fluid control valve 305 is partially closed to restrict flow, the line pressure increases. The fluid flow system 300 can be controlled via the meter electronics 20 or the system controller 310, for example. Alternatively, the first and second control valves 302, 305 may be controlled manually by a user or operator.

Because most vibrating meters do not include pressure sensors within the meter's conduits, the presently described embodiments provide an alternative method for determining the static pressure within the conduits of the vibrating meter using flow characteristics that can be measured by the vibrating meter 5 along with pressure measurements taken upstream and/or downstream of the vibrating meter 5. As discussed above, many vibrating meters, and Coriolis flow meters in particular, are capable of measuring a wide variety of flow characteristics such as for example, a mass flow rate, a volume flow rate, a fluid density, a totalized mass flow rate, and a temperature. One or more of these measured flow characteristics can be used in determining the static pressure within the sensor assembly 10.

According to an embodiment, a saturation pressure of the fluid within the sensor assembly 10 can be also be determined based upon a known or previously determined relationship between saturation pressure and one or more flow characteristics. For example, if the fluid flow system 300 is used in a hydrocarbon measurement application, it has been found that there is an approximate relationship between a hydrocarbon fluid's density and its saturation pressure at a given temperature. This can be seen in FIG. 5, for example.

Figure 5:
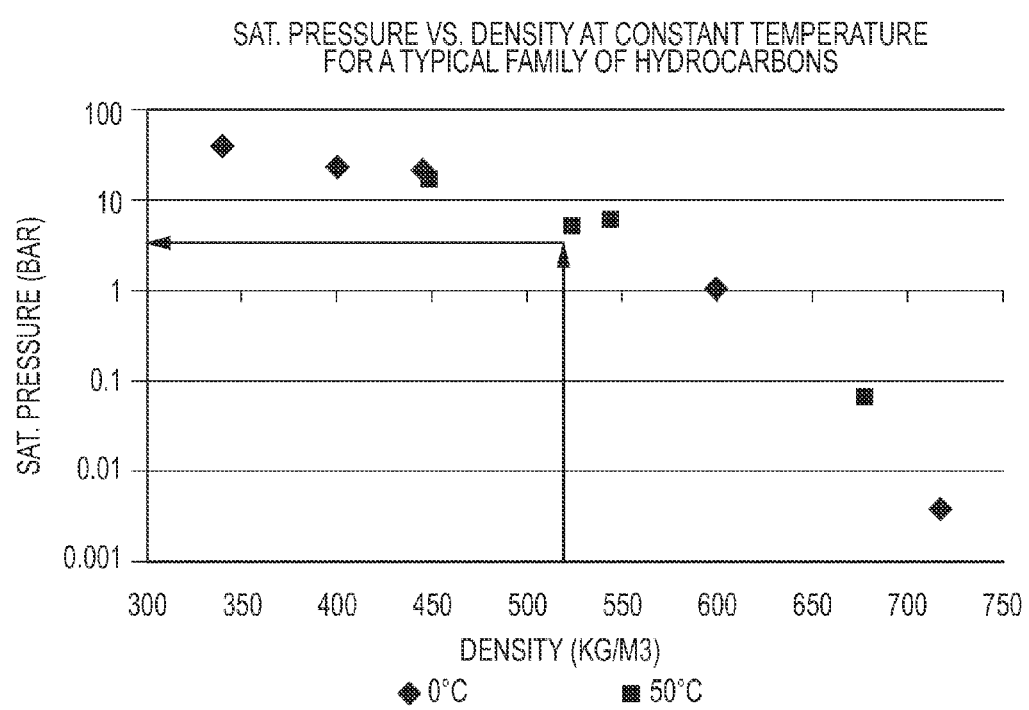
FIG. 5 shows a graph of saturation pressure versus density at constant temperature for a typical family of hydrocarbons according to an embodiment.

FIG. 5 shows a chart of saturation pressure versus density for an example family of hydrocarbons at two different temperatures. As can be seen, for both 0° C. and 50° C., an approximately linear relationship exists between density and saturation pressure. Therefore, if the vibrating meter 5 determines the density and temperature of the fluid flowing through the sensor assembly 10, the fluid's saturation pressure can be determined. The use of a chart or lookup table such as shown in FIG. 5 allows for a substantially real-time determination of the saturation pressure of the fluid. It should be appreciated that other methods, such as obtaining saturation pressures from stored values could be used. However, in custody transfer applications the precise purity of the mixture varies by location and thus, it may not be practical or accurate to use an assumed saturation pressure. In contrast, by measuring the density and temperature, a saturation pressure can be interpolated using a graph similar to the graph shown in FIG. 5.

Figure 6:
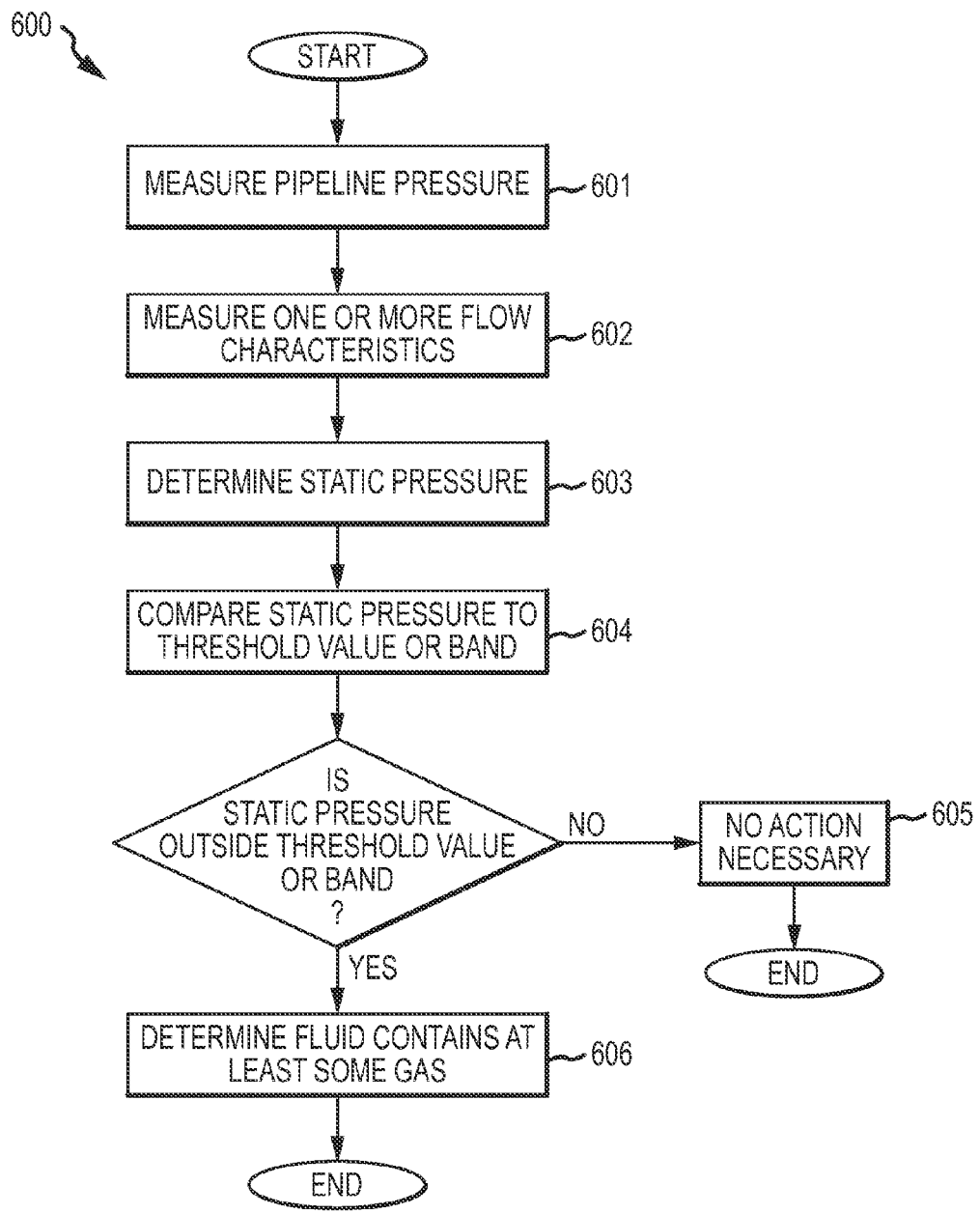
FIG. 6 shows a processing routine according to an embodiment.

FIG. 6 shows a processing routine 600 that may be used to determine a static pressure of the fluid within the sensor assembly 10. The processing routine 600 may be stored in the meter electronics 20, for example. Alternatively, the processing routine 600 may be stored within and conducted by the system controller 310. According to an embodiment, the processing routine 600 starts in step 601 where a static pressure of the fluid in the pipeline 301 is measured. The pressure in the pipeline 301 may be measured using the first pressure sensor 303 and/or the second pressure sensor 304. The measured pressure can be provided to the meter electronics 20 as the first or the second pressure signal 213, 214. Alternatively, the measured pressure may be provided directly to the system controller 310. While the pressure may be measured at any point in the pipeline 301, in a preferred embodiment, the pressure sensor 303 and/or 304 are located proximate the sensor assembly 10 such that a pressure drop between the two pressure sensors 303, 304 may be attributed to the sensor assembly 10 and not another component of the fluid flow system 300.

In step 602, the vibrating meter 5 can measure one or more flow characteristics based on sensor signals 210 received from the sensor assembly 10. According to an embodiment, the measured flow characteristic can comprise a measured mass flow rate. According to another embodiment, the measured flow characteristic may comprise a measured volumetric flow rate. The measured flow characteristics may further comprise a measured density. The measured flow characteristics may further comprise a measured temperature.

In step 603, the meter electronics 20 or the system controller 310 can determine the static pressure within the sensor assembly 10. According to an embodiment, the static pressure within the sensor assembly 10 can be determined based on the measured pipeline pressure along with the one or more flow characteristics. As explained above, the dimensions (cross-sectional area and length) of the sensor assembly 10 and the friction factor are known or can easily be measured. Therefore, using the one or more flow characteristics, the viscous pressure loss can be determined. Further, if the fluid velocity is determined for both the point 331 where the pressure sensor 303 is located as well as the fluid velocity at point 332 or any other point within the sensor assembly 10, the static pressure at that point can be determined by rearranging equations (7) and (8) for the static pressure. According to one embodiment, the static pressure determined comprises the static pressure just prior to exiting the sensor assembly 10. Determining the static pressure at this point will generally be the lowest static pressure due to the viscous pressure loss. However, the static pressure at other points in the sensor assembly can be determined simply by adjusting the length, L, from equations (7) and (8).

The processing routine 600 can determine if the fluid contains at least some gas based on the static pressure within the sensor assembly 10. For example, in step 604, the static pressure can be compared to a threshold value or band (range of values). The threshold valve can be based upon a determined saturation pressure of the fluid, for example. Alternatively, the threshold value may be based upon a user input value. The user input value may not comprise the saturation pressure of the fluid, but rather, may comprise a value that is assumed to be above the saturation pressure such that if the static pressure is above the threshold value, it will also be above the saturation pressure. The threshold value or band may be above a determined saturation pressure by a predetermined amount. This may allow for some variation in the static pressure without temporarily falling below the saturation pressure. According to an embodiment, the saturation pressure can be determined based on a measured density and temperature, for example. According to another embodiment, the saturation pressure can be determined based on a previously stored value.

According to an embodiment, if the static pressure is within the threshold value or band of values, the process can proceed to step 605 where no further action may be required. For example, if the threshold value is based on the determined saturation pressure and the static pressure is above the saturation pressure, no further action may be required.

However, according to an embodiment, if the static pressure is outside the threshold value or band, the process can proceed to step 606 where the system controller 310 or the meter electronics 20 may perform one or more actions. For example, if the static pressure is below the saturation pressure, the system controller 310 or the meter electronics 20 may perform one or more actions. According to an embodiment, an action taken if the static pressure is outside the threshold value or band may be to determine that the fluid contains at least some gas. As discussed above, if the static pressure is below the saturation pressure, for example, the fluid will begin to flash or outgassing will occur, resulting in at least some gas being present in the fluid.

According to an embodiment, another action that can be taken could be for the system controller 310 to adjust one or more of the first or second valves 302, 305 in order to lower the fluid velocity or raise the line pressure. Alternatively, a warning may be issued alerting a user or operator that the fluid may be outgassing or flashing. Those skilled in the art will readily recognize alternative procedures that may be followed if the processing routine 600 determines that the measured static pressure within the sensor assembly 10 has fallen below the fluid's saturation pressure.

According to another embodiment, the meter electronics 20 or the system controller 310 may confirm that the fluid is below the saturation pressure based on a drive gain of the vibrating meter 5. The drive gain can be defined as the pick-off coil voltage divided by the drive coil voltage. As is known in the art from U.S. Pat. No. 6,564,619, for example, drive gain of a Coriolis flow meter can be used to detect the presence of gas.

Although the above discussion determines the static pressure of the fluid within the sensor assembly 10, it should be appreciated that the static pressure of the fluid may be determined at other locations within the fluid flow system 300 using the above method as long as the cross-sectional flow area of the location of interest is known. Determining the static pressure of the fluid at other locations of the fluid flow system 300 assumes that the flow characteristics determined by the sensor assembly 10 are the same at the location of interest.

Figure 7:
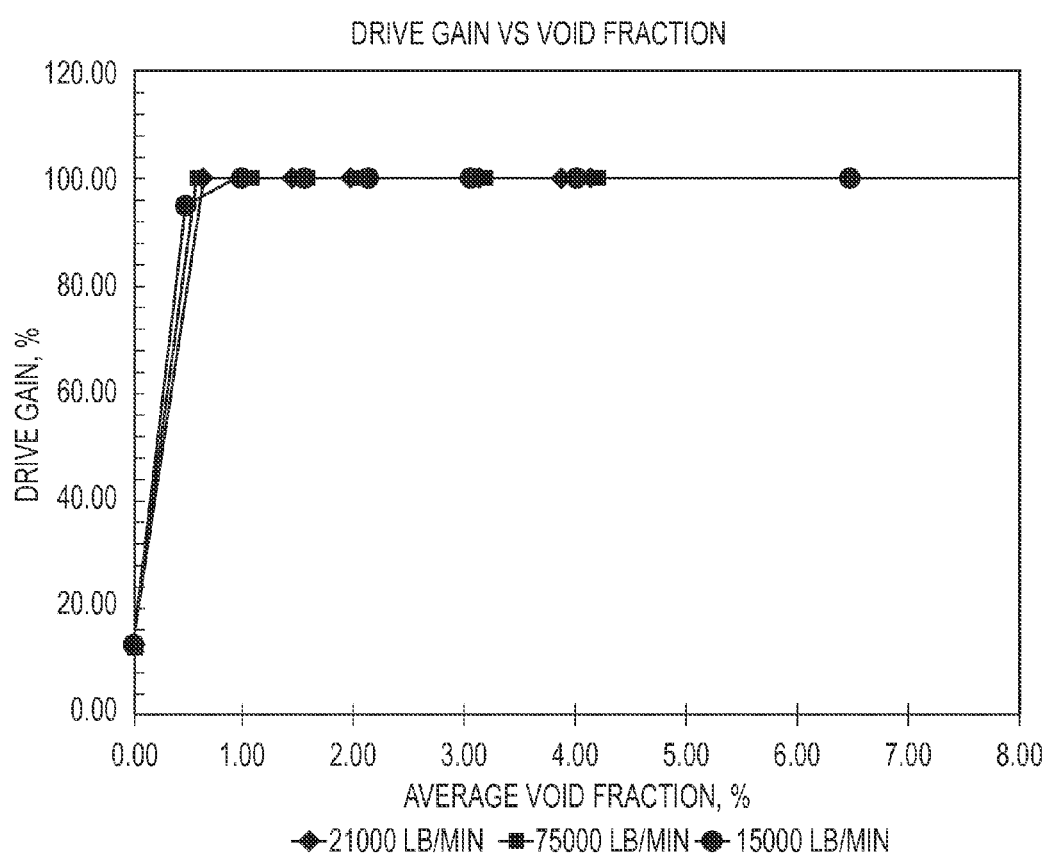
FIG. 7 shows a graph of drive gain versus average gas void fraction according to an embodiment.

FIG. 7 shows a chart of drive gain versus void fraction for an exemplary vibrating meter. As shown, the drive gain rapidly increases to around 100% prior to reaching a void fraction of 1%. Therefore, the meter electronics 20, the system controller 310, or both can compare the measured drive gain to a threshold drive gain level. If for example, the measured drive gain exceeds the threshold drive gain level, the fluid flow may be below the saturation pressure or some other error has occurred resulting in entrained gas. If entrained gas is detected, the fluid flow may be adjusted to decrease the flow velocity or increase the line pressure in order to increase the static pressure within the sensor assembly 10 to above the saturation pressure. Therefore, monitoring the drive gain to determine gas in the fluid can be used as a confirmation that the fluid has remained below the saturation pressure.

The embodiments described above provide a system and method for determining the presence of gas within a vibrating meter 5 based on a determined static pressure within a sensor assembly 10 of the vibrating meter 5. Unlike prior art systems that only measure the pressure of the fluid within the pipeline, the embodiments described above utilize one or more flow characteristics along with a measured pressure of the fluid within the pipeline 301 to determine a static pressure of the fluid within the sensor assembly 10. Therefore, a more accurate and improved measurement can be obtained. Based on the determined static pressure within the sensor assembly, a determination can be made as to whether the fluid contains at least some gas. For example, the determination can be made that the fluid contains at least some gas if the static pressure is outside a threshold value or band. If it is determined that the fluid does contain at least some gas, further action can be taken.

The detailed descriptions of the above embodiments are not exhaustive descriptions of all embodiments contemplated by the inventors to be within the scope of the present description. Indeed, persons skilled in the art will recognize that certain elements of the above-described embodiments may variously be combined or eliminated to create further embodiments, and such further embodiments fall within the scope and teachings of the present description. It will also be apparent to those of ordinary skill in the art that the above-described embodiments may be combined in whole or in part to create additional embodiments within the scope and teachings of the present description.

Thus, although specific embodiments of, and examples for, the flow control system are described herein for illustrative purposes, various equivalent modifications are possible within the scope of the present description, as those skilled in the relevant art will recognize. The teachings provided herein can be applied to other fluid flow systems, and not just to the embodiments described above and shown in the accompanying figures. Accordingly, the scope of the embodiments should be determined from the following claims.

We claim:

1. A fluid flow system (300), comprising:
a pipeline (301) with a flowing fluid;
a first pressure sensor (303) located within the pipeline (301) and determining a first pressure within the pipeline (301);
a vibrating meter (5) including:
a sensor assembly (10) located within the pipeline (301) proximate to and in fluid communication with the first pressure sensor (303); and
a meter electronics (20) in electrical communication with the sensor assembly (10) and configured to receive one or more sensor signals (210) and measure one or more flow characteristics;
a system controller (310) in electrical communication with the first pressure sensor (303) and the meter electronics (20), and configured to:
receive the first pressure measurement from the first pressure sensor (303);
receive the one or more flow characteristics from the meter electronics (20);
determine a static pressure of the fluid within the sensor assembly based on the first pressure measurement and the one or more flow characteristics;
determine if the fluid contains at least some gas based on the static pressure of the fluid;
determine the fluid contains at least some gas if the static pressure of the fluid is outside a threshold value or band based upon a saturation pressure of the fluid;
determine a drive gain of the vibrating meter;
compare the drive gain to a drive gain threshold value, and determine the static pressure is outside the threshold value or band if the drive gain exceeds the drive gain threshold value; and
adjust the fluid flow if the static pressure of the fluid is outside the threshold value or band, wherein the adjustment is at least one of increasing a pipeline line pressure and decreasing a fluid flow rate.

2. The fluid flow system (300) of claim 1, wherein the system controller (310) is further configured to determine the saturation pressure based on a measured temperature and density of the fluid.

3. A meter electronics (20) for a vibrating sensor (10) located within a pipeline (301) with a flowing fluid and in fluid communication with one or more pressure sensors (303, 304), the meter electronics (20) configured to:
measure one or more flow characteristics of the fluid flowing through the sensor assembly (10);
determine a drive gain of the vibrating sensor;
receive a first pressure signal (213) from one or more pressure sensors indicating the pressure of the fluid in the pipeline (301);
determine a static pressure of the fluid within the sensor assembly based on the first pressure signal (213) and the one or more measured flow characteristics;
compare the drive gain to a drive gain threshold value, and determine the static pressure is outside a threshold value or band if the drive gain exceeds the drive gain threshold value; and
determine if the fluid contains at least some gas based on if the static pressure of the fluid is outside a threshold value or range;
adjust the fluid flow if the static pressure of the fluid is outside the threshold value or band, wherein adjusting the fluid flow is at least one of increasing the pipeline line pressure and decreasing a fluid flow rate.

4. The meter electronics (20) of claim 3, wherein the threshold value or band is based upon a saturation pressure of the fluid.

5. The meter electronics (20) of claim 4, further configured to determine the saturation pressure based on a measured temperature and density of the fluid.

6. A method for operating a fluid flow system including a fluid flowing through a pipeline, a first pressure sensor located within the pipeline, and a vibrating meter including a sensor assembly in fluid communication with the first pressure sensor, the method comprising steps of:
measuring a pressure of the fluid within the pipeline using the first pressure sensor;
measuring one or more flow characteristics of the fluid using the vibrating meter;

determining a static pressure of the fluid within the sensor assembly based on the measured pressure of the fluid within the pipeline and the one or more flow characteristics; and determining if the fluid contains at least some gas based on the static pressure of the fluid;

determining the fluid contains at least some gas if the static pressure of the fluid is outside a threshold value or band;

determining a drive gain of the vibrating meter;

comparing the drive gain to a drive gain threshold value; and determining the static pressure is outside a threshold value or band if the drive gain exceeds the drive gain threshold value; and adjusting the fluid flow if the static pressure of the fluid is outside the threshold value or band by at least one of increasing a pipeline line pressure and decreasing a fluid flow rate based upon a saturation pressure of the fluid.

7. The method of claim 6, further comprising a step of determining the saturation pressure based on a measured temperature and density of the fluid.

\* \* \* \* \*